United States Patent [19]
Keeton

[11] Patent Number: 5,144,765
[45] Date of Patent: Sep. 8, 1992

[54] DUAL NOISE MAKING DEVICE FOR LURES

[76] Inventor: James R. Keeton, Rte. 1 Box 291, Parsons, Tenn. 38363

[21] Appl. No.: 733,196

[22] Filed: Jul. 19, 1991

[51] Int. Cl.$^5$ ............................................. A01K 85/00
[52] U.S. Cl. ................................. 43/42.31; 43/42.36; 43/44.9
[58] Field of Search ................. 43/42.31, 42.09, 42.13, 43/42.36 X, 44.9 X, 42.15, 42.24

[56] References Cited

U.S. PATENT DOCUMENTS

| | | | |
|---|---|---|---|
| 3,180,052 | 4/1965 | Malesko | 43/44.97 |
| 3,220,139 | 11/1965 | Bessler | 43/42.36 |
| 3,284,944 | 11/1966 | Settle | 43/42.15 |
| 4,617,753 | 10/1986 | Pauley et al. | 43/42.09 |
| 4,633,609 | 1/1987 | Brown | 43/42.31 |
| 4,744,169 | 5/1988 | Nochta | 43/42.24 |
| 4,793,089 | 12/1988 | Long et al. | 43/42.13 |
| 5,024,019 | 6/1991 | Rust et al. | 43/42.31 |

Primary Examiner—Richard K. Seidel
Assistant Examiner—Chuck Y. Mah
Attorney, Agent, or Firm—Julian C. Renfro

[57] ABSTRACT

A lure-type device adapted for use by a fisherman, comprising a non-floating body member having a central longitudinal axis, with this device being able to be readily installed upon a fishing line. This device has an elongate portion of reduced diameter extending along such central axis, upon which a separate, toroidally-shaped collar member is loosely disposed. The collar member is intended to move with respect to this elongate portion for a limited extent as the device moves through the water, with the movement of the collar member with respect to the elongate portion creating a noise attractive to fish. The collar member may be hollow and contain noise-producing members, and in addition, vibration-producing means may be utilized to increase the noise made by the noise-producing members utilized inside the collar.

19 Claims, 4 Drawing Sheets

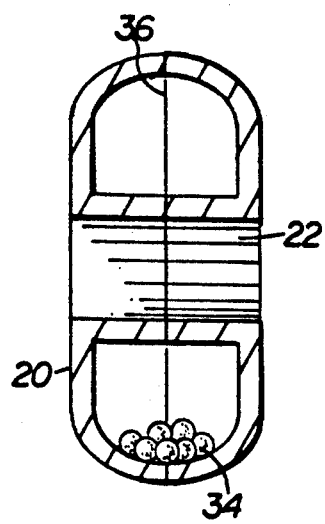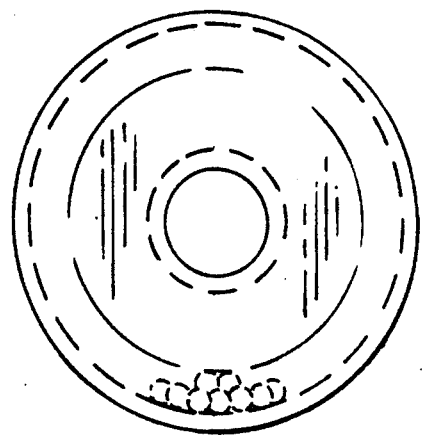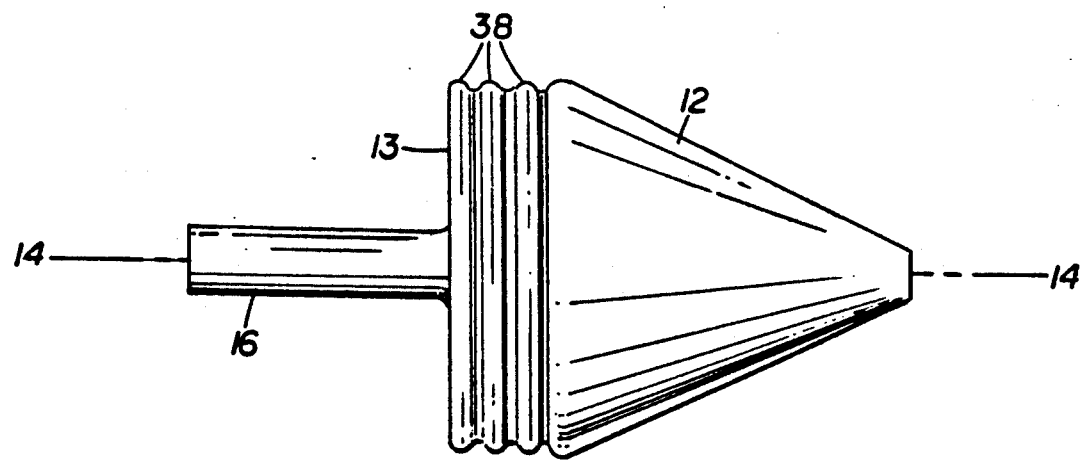

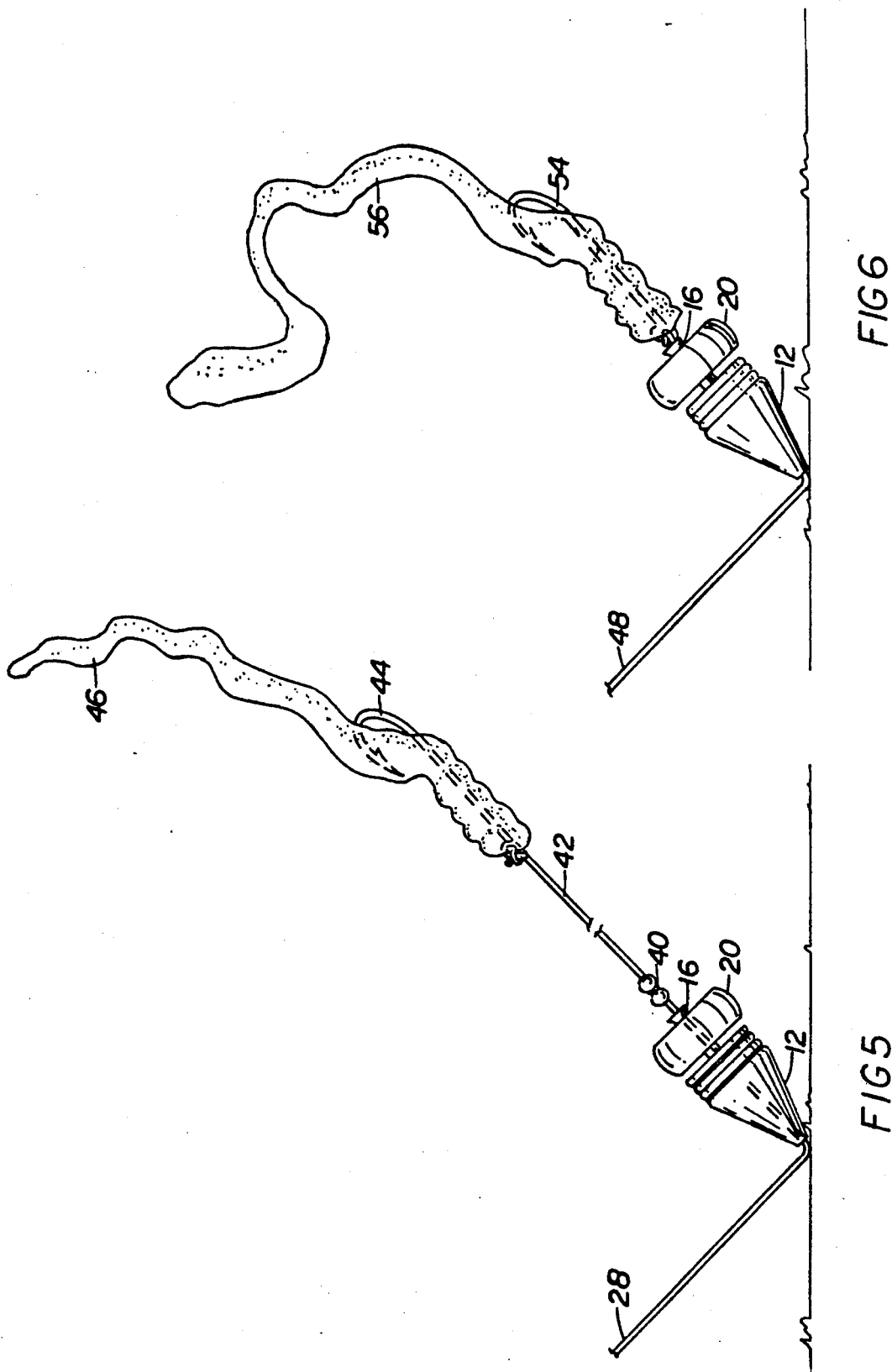

DUAL NOISE MAKING DEVICE FOR LURES

BACKGROUND OF THE INVENTION

1. Field of the Invention

This invention relates to the field of fishing lures, and includes slip sinkers utilized as part of lures.

2. Description of the Prior Art

It is well known that the primary purpose of conventional fishing sinkers is to add weight near the end of the fishing line to facilitate casting and to assure that the attached fishing lure or bait is properly positioned below the surface of the water. Sinkers are usually made from lead, so that sufficient weight is obtained to perform these functions without requiring a large volume of material. Sinkers are typically small, generally irregularly shaped objects which ordinarily function only as a source of weight for the fishing line.

In contrast, fishing lures are generally designed to attract fish and to stimulate their feeding instincts. Artificial fishing lures are designed to simulate the color and the movement of a particular type of fish food, and the fish is attracted upon viewing the lure. It is also known that fish are able to detect vibrations in the water. Lures have therefore been created that will produce sound vibrations when drawn through the water, and typically these noise making fishing lures include at least one metal ball located within an airtight cavity in the lure.

The problem with the conventional noise making lures is that the noise making feature generally must be incorporated within the lure as it is manufactured. Alternatively, a silent lure may be modified to add a noise making feature, but such a noise making feature, however, is not easily incorporated within many types of lures because the movement of metal balls within the chamber interferes with the intended movement of the lure itself through the water.

The Gardner U.S. Pat. No. 4,008,539 entitled "Noise Making Slip Sinker" is an example of a component combining the functions of sinker and noise making device designed to attract fish. Utilized inside the shell or body portion of the Gardner device are a plurality of small, generally spherical metal balls, and the impact of these balls against the plastic shell produces vibrations attractive to fish. Although the Gardner device has proven to be generally successful for the device intended, it has turned out to be too bulky for many applications.

It was in an effort to overcome the disadvantages of prior art devices of these types that the present invention was evolved.

SUMMARY OF THE INVENTION

The instant invention pertains to a noise making slip sinkers and jig heads adapted for use by a fisherman, each of which devices comprise a non-floating body member having a central longitudinal axis. A slip sinker in accordance with this invention is readily attachable to a fishing line, such as by the provision of a hole along the central axis of the body member, through which the fishing line can extend, whereas my novel jig head utilizes a forward attachment point.

The body member I prefer to utilize for a slip sinker has an elongate portion of reduced diameter extending along such central axis, and upon the exterior of this elongate portion, a toroidally-shaped collar member is loosely disposed. Therefore, as the slip sinker moves through the water, the collar member is caused to move with respect to the elongate portion, and in so doing, to make a noise attractive to fish.

An interior portion of my novel collar member may be hollow, and contain a number of noise-producing members which, for example, may be loosely disposed, generally spherically-shaped members. The latter members tend to shift their respective positions during movement of the collar member with respect to the elongate portion. Such shifting of the noise-producing members or balls causes noise attractive to fish, with this latter noise being in addition to the noise made by movement of the collar member with respect to the elongate portion of the body member.

To prevent loss of the collar member from the elongate portion, I may flare the distal end of the elongate portion to increase its diameter somewhat. In addition, upon the exterior of the body member a series of encircling rings may be provided, for a purpose to be described hereinafter.

A jig head utilizing my novel construction likewise utilizes the novel noise making collar or ring, but the fishing line ordinarily does not extend through the centerline of the body of the device, but rather is attached to a forward portion of the jighead. A spinner bait utilizing my novel construction utilizes a blade serving to cause the entire assembly to shake or vibrate, so if the collar member contains loose balls or spheres, they will be caused to vibrate in a highly desirable manner.

It is therefore a primary object of this invention to provide slip sinkers and jig heads of relatively simple and inexpensive construction, each of which makes noises attractive to fish as it moves through the water.

It is another object of this invention to provide slip sinkers and jig heads of greatly simplified construction that will advantageously make noises attractive to fish, particularly when the fisherman tugs on the fishing line.

It is still another object of this invention to provide readily manufactured slip sinkers and jig heads, each having a body member equipped with an elongate portion, upon which elongate portion a toroidally-shaped collar member is loosely disposed, with the movement of the collar member with respect to this elongate portion at the time of body member motion creating a noise attractive to fish.

It is yet another object of this invention to provide a toroidally-shaped collar member movable for a limited extent relative to the body portion of a slip sinker or jig head, intended to make noise attractive to fish as a result of such relative movement, with the collar member having an interior portion in which noise-producing members are contained, with such members making a noise in addition to the noise made by the collar member as the slip sinker moves through the water.

It is yet another object of this invention to provide slip sinkers and jig heads of a configuration that can be readily manufactured in small sizes, and that will make clacking sounds resembling that of crawdads.

It is yet still another object of this invention to utilize a noise making collar on a device utilized as spinner bait, which novel collar and the noise-producing members contained therein will be caused to vibrate in a manner fish find to be highly attractive.

These and other objects, features and advantages will become more apparent as the description proceeds.

BRIEF DESCRIPTION OF THE DRAWINGS

FIG. 3a is a cross-sectional view revealing the manner in which two halves of the circular collar may be joined together;

FIG. 3b is a side elevational view of the circular collar of FIG. 3a;

FIG. 4 is a side elevational view of a preferred type of body member to be utilized as a slip sinker in accordance with this invention;

FIG. 5 is a view revealing one way in which the instant slip sinker may be utilized, in this instance being a so-called Carolina rig;

FIG. 6 is a view similar to FIG. 5, but revealing another way in which the instant slip sinker may be employed, this being a so-called Texas rig, particularly to be utilized when fishing in vegetation;

DETAILED DESCRIPTION

Figure 1:
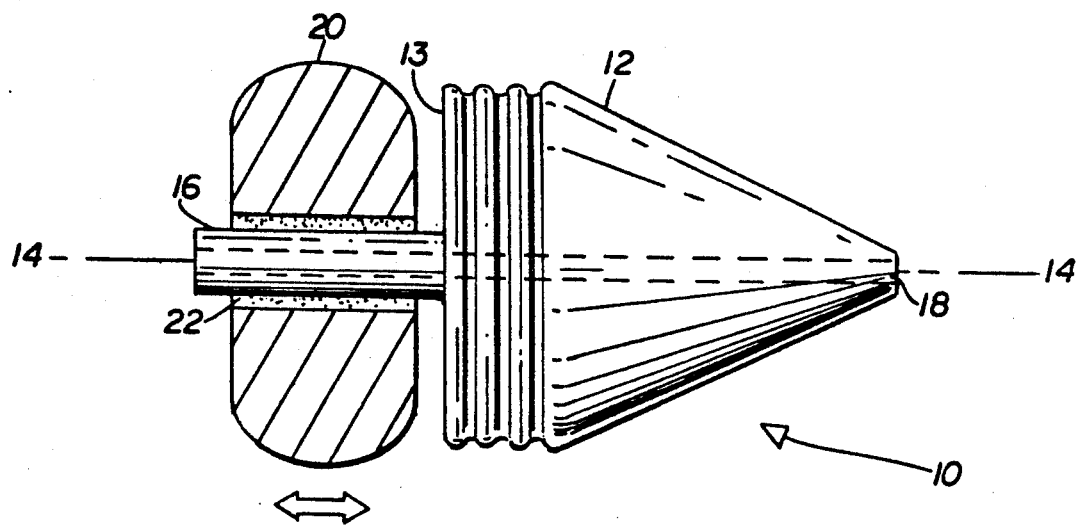
FIG. 1 is a view to a comparatively large scale of a typical slip sinker having dual noise making components, which slip sinker has been constructed to utilize a novel collar member constructed in accordance with this invention.

With initial reference to FIG. 1 it will there be seen that I have provided a preferred embodiment of a dual noise making device for lures in accordance with this invention, in this instance a novel noise making slip sinker 10. This figure reveals a non-floating body member 12 of tapered configuration, to which a fishing line is to be attached. The body member 12 enlarges rearwardly from a nose portion of comparatively small diameter, terminates in a rear portion 13, and is typically constructed of a heavy metal. The body 12 is disposed symmetrically about longitudinal axis 14, and has an elongate portion 16 of reduced diameter that extends along such longitudinal axis. A hole 18 runs along the longitudinal axis 14 for the length of the body member 12 as well as along the centerline of the elongate portion 16, through which hole a fishing line is to be caused to extend.

It is desirable for this primary embodiment of my slip sinker invention to make a distinctive noise as it travels through the water, so to this end I provide a collar member 20 that will interact with other components of my device, so as to serve as a highly effective noise-producing member.

Preferably, the collar member 20 is toroidally-shaped, and has an external diameter approximately the same as the exterior diameter as the base portion 13 of the body member 12. The collar member or ring 20 is equipped with a somewhat oversize central hole 22 so that the ring or collar member can be loosely accommodated upon the elongate portion 16, and from time to time to come into contact with the rear surface or base portion 13 of the body member 12.

Figure 2:
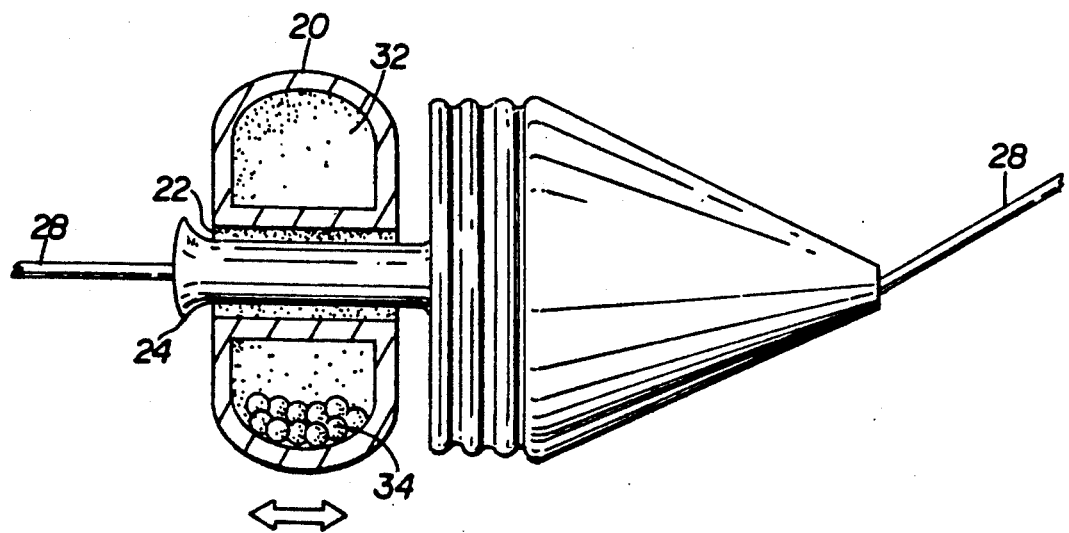
FIG. 2 is a view similar to that of FIG. 1, but with the circular collar member sectioned to reveal that the collar member may contain a plurality of noise-producing members in the nature of balls or spheres.

It is obviously not desirable for the collar member 20 to slide off the end of the elongate portion 16, so to prevent this, I typically flare the distal end of the elongate portion after the collar member has been inserted, with this flaring being shown at 24 in FIG. 2. As is obvious, this flaring of the end of the elongate portion serves to increase the diameter thereof, and is larger than the central hole 22 through the collar or ring 20, so that the collar or ring cannot be lost.

It is thus to be seen that as the slip sinker 10 travels through the water, the collar member 20 is caused to move for a limited extent with respect to the elongate portion 16, and in so doing to make a noise attractive to fish. In this embodiment of my invention, the flared portion serves as an excursion-limiting means for the collar member. As will be made clear hereinafter, the collar member 20 typically moves with respect to the elongate portion 16 at such time as the fisherman tugs upon the fishing line. I have found that the collar member makes a sound similar to that made by crawdads, which is particularly advantageous.

The toroidally-shaped collar member 20 may be of solid construction, as might well be presumed from FIG. 1, but I prefer for the collar member to have a hollow portion 32 in which noise producing means are contained. For example, the noise-producing components may involve a plurality of small spheres 34 or the like, that are loosely accommodated; note FIG. 2. Thus, in addition to the noise made during travel of my novel slip sinker through the water by motion of the collar member 20 with respect to the elongate portion 16, the small spheres 34 inside the collar embodiment depicted in FIG. 2 may create a noise of a different frequency than that involved with the basic motion of the collar member.

Although I am not to be limited to any particular manner in which the slip sinker is attached to a fishing line, I prefer to have a fishing line 28 extend rearwardly through the center hole 18 of the slip sinker, in the manner shown in FIG. 2, after which the end of the fishing line is suitably knotted to prevent the line slipping back through the hole 18. As will be pointed out hereinafter, the end of the fishing line may be attached directly to the eye of a hook, or else to a barrel swivel or the like. Either of these arrangements will of course prevent the slip sinker from becoming separated from the line 28.

It is to be noted that my novel slip sinker 10 could also be used in the manner of a spinner bait type lure, or in the manner of a jighead. These modifications will be discussed at length hereinafter.

With reference now to FIG. 3a, it will be seen that I have revealed a preferred embodiment of the donut shaped hollow collar member 20, which is of the type usable with the slip sinker, the jig head, or the spinner bait embodiments of my device. As illustrated in FIG. 3a, the collar member may be made in two substantially identical halves, such as of molded plastic or the like. After the insertion of the noise-producing members, such as metallic balls or spheres 34, the halves can be brought into contact and their edges secured together at seam 36 by the use of a suitable cement or the like. As one example, one of the plastic halves can be treated with a special solution, such that when a pair of halves are brought together, a permanent bond between the two components is brought about.

It is to be understood that the plastic halves constituting the collar member can be created in contrasting colors, such as to tend to blend in with the color of the soft plastic worm or grub with which the collar is to be used. I may use a natural color, a fluorescent or neon color, or I can even utilize metal flakes to add sparkle to the lure.

Turning to FIG. 4, it is to be understood that although I am not to be limited to any particular material or constructional techniques, I have found it preferable for the slip sinker to be constructed with its body member 12 of solid brass, and to utilize an integrally constructed elongate portion 16. A typical metal cutting lathe may of course be utilized in the construction of the body member 12, with the elongate portion 16 being created by merely cutting into the brass more deeply than at the location of the bullet-shaped portion of the body member. When made on a lathe, my novel slip sinker requires no subsequent handwork.

As another alternative, my slip sinker may be cast out of lead, or it may be manufactured out of stainless steel.

As is obvious, the size of my noise-making slip sinker can vary in accordance with the specific need, but it is to be emphasized that my slip sinker is easy to manufacture in small sizes. One reason in particular why this is true is that it is unnecessary for noise-producing members to be inserted into the interior of the body member 12, as would have been required in accordance with the teachings of certain prior art patents pertaining to noise-making slip sinkers.

It will be noted from several of the figures, such as FIG. 4, that I prefer for a spaced series of rings 38 to encircle the body member 12 near the aft end or base portion 13 thereof. In the event the body member 12 is made on a lathe, the rings 38 can be readily cut into the basic material of the body member. The rings 38 are designed to cause the lure body to undertake an erratic and unpredictable movement as the lure body is moved along the bottom of the pond, lake or river. This erratic motion is principally caused at such time as the lure body moves across a rock, stick or other such object residing on the bottom of the streambed or other body of water.

As result of such contact with the submerged object, the loosely mounted collar 20 will be caused to move along the rearwardly extending projection 16, and to make a noise attractive to fish, particularly at such time as the collar member comes into contact with the base portion 13 of the body member 12.

With reference to FIG. 5 it will be seen that I have illustrated a certain type of arrangement utilizing my novel slip sinker, with this being known as a Carolina rig. In accordance with this configuration, after the fishing line 28 has been threaded through the central hole 18 of the body member 12, and therefore through the rearwardly extending elongate portion 16, the end of the line 28 is tied to one loop of a barrel swivel 40. The barrel swivel is larger than the hole through the lure, thus limiting the downward travel of the slip sinker along the line.

One end of a short length of monofilament line 42 is then tied to the other loop of the barrel swivel 40, and to the other end of the short length of monofilament line a hook 44 is tied. A soft plastic lure 46 is then to be inserted onto the hook, and as a result, the lure can reside a distance off of the bottom of the body of water, as depicted in FIG. 4, as a result of a degree of natural buoyancy of the lure. The short length of monofilament line 42 can be, for example, one to three feet long, and by its use, the lure can reside in a very lifelike attitude that may well be attractive to certain fish.

It is to be noted from FIG. 4 that the body member 12 of the slip sinker resides on the bottom of the body of water, and as the body member is caused to move along the bottom, due to the fisherman tugging on the line, or as a result of tidal forces or the motion of a stream, the circular collar 20 makes a noise the fish find attractive. Although I am not to be limited to any fixed distance, I have found that if the collar 20 is able to move along the elongate portion 16 for a distance of approximately ⅛ inch, it will make a desirable amount of noise, particularly as the collar comes into contact with the flat base portion 13 of the body member 12. As a further point, if the collar member is hollow, and contains noise-producing members, such as the small balls or spheres as discussed in connection with FIG. 3a, an additional noise making capability is brought into play.

With reference now to FIG. 5 it will be seen that I have illustrated another type of arrangement utilizing my novel slip sinker, with this being known as a Texas rig. In accordance with this arrangement, after the fishing line 48 has been threaded through the central hole 18 of the body member 12, the end of the line is directly tied to the eye of a hook 54. A soft plastic lure 56 is then to be inserted onto the hook, and as a result, the lure can reside in the manner depicted in FIG. 5.

It is to be noted from FIG. 5 that the body member resides on the bottom of the body of water, which means that the hook and lure are likewise disposed close to the bottom, which is ideal when it is desired to fish in vegetation. It is to be noted that when the body member is caused to move along the bottom, due to the line being tugged upon by the fisherman, or as a result of motion of the water, the circular collar 20 utilized on the body member 12 makes a noise the fish find attractive, particularly at such time as the collar comes into contact with the base portion 13 of the body member 12. As a further point, if the collar member is hollow, and contains a number of small balls or spheres 34, an additional noise making effort is brought about.

It is to be understood that the eye of the hook 54 and the knot utilized to secure the fishing line to the eye of the hook represent a configuration too large to pull through the center hole 18 of the body member, thus preventing displacement of the slip sinker from the appropriate position or location on the rig. It is to be understood that there is sufficient distance between the flare on the end of the elongate portion 16, and the base 13 of the body member 12, as will permit sufficient excursion of the collar member 20 as to make a desirable amount of noise when the slip sinker is in use.

As previously mentioned, the body member 12 of my slip sinker is made of metal, typically brass, but other metals such as lead or stainless steel could also be used. The collar member may also be made of metal, but it also could be made of plastic or fiberglass.

My novel slip sinker technique can be utilized in a variety of weights and sizes, and for example, it can be manufactured in ⅛ ounce, ¼ ounce, ½ ounce, ¾ ounce or 1 ounce sizes. Depending on the size of the slip sinker, the excursion distance of the collar can vary from the ⅛ inch mentioned above as an ideal distance the collar can move along the elongate portion 16.

Figure 7:
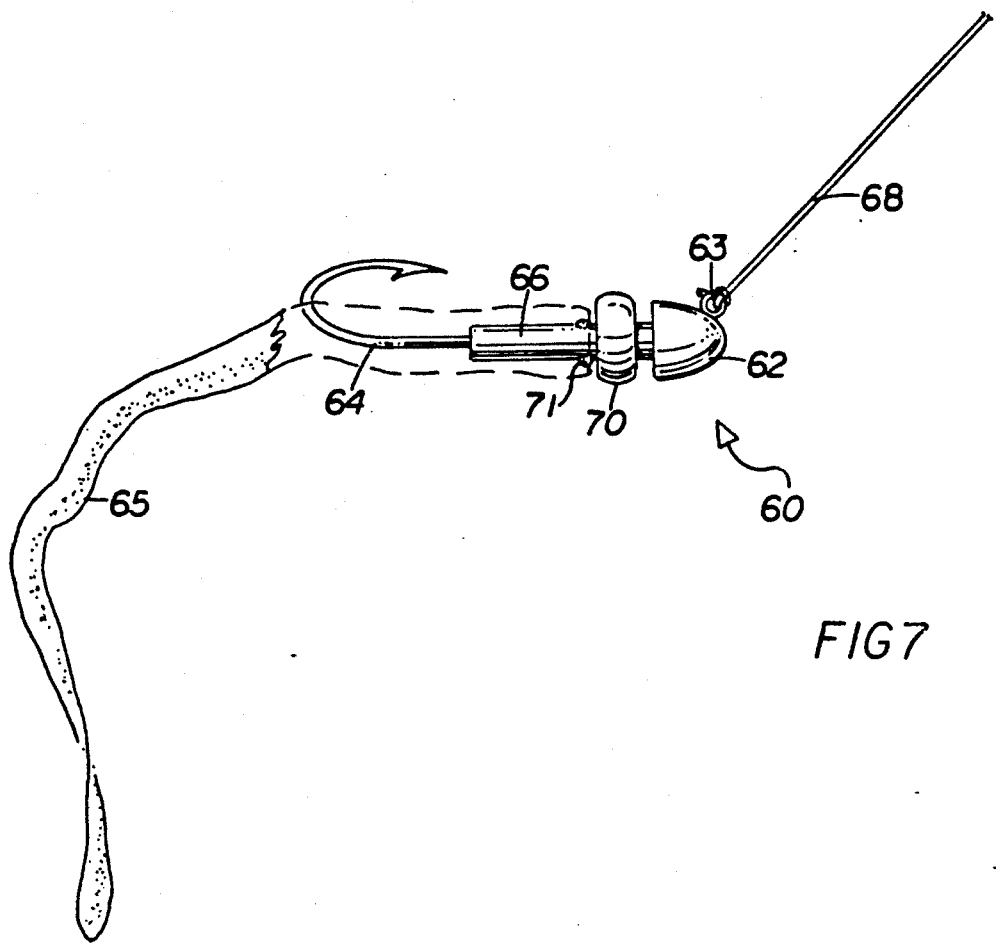
FIG. 7 is a side elevational view of a jig head upon which one of my novel noise making collars is utilized, with a soft plastic lure forming the bait, and with the fishing line attached to a forward portion of the jig head.

As mentioned hereinbefore, my invention is not limited to use with slip sinkers, for as shown in FIG. 7, my novel noise making concept can be utilized in conjunction with a jig head 60, utilizing a head member 62 configured to have a suitable rearward extension 66 provided to receive a toroidally-shaped collar 70. As revealed in FIG. 7, the rearward extension is of sufficient length as to permit the noise-making collar 70 to be movable for a sufficient distance as to assure a desirable amount of noise being made. A stop or abutment 71 is utilized on the rearward extension 66 to prevent the collar from sliding too far aft, which abutment may be created by squeezing or upsetting the metal of the rearward extension to such an extent that the collar 70 cannot move past that point.

As described in conjunction with previous embodiments, the collar member 70 may contain noise-producing members, such as being hollow and containing a plurality of balls or spheres, typically of metal, that are designed to make noise at such time as the collar is caused to move.

I prefer for the head 62 of the device 60 depicted in FIG. 7 to be quite heavy, such as being made of lead, with an attachment point, such as an eye 63, utilized on the upper portion of the head, to facilitate the fishing line 68 being attached to this device.

It is well known that many different sizes and types of jig heads exist, and a jig head of the type depicted in FIG. 7 is typically created by placing a hook in a suitably configured mold, and then pouring molten lead into the mold, so as to cause the shank of the hook 64 to be incorporated into the head of the device. In this type of unitary construction, the eye of the hook may be used to create the attachment point 63 for the fishing line.

In use, the fisherman need only insert a soft plastic lure 65, or other suitable bait, onto the hook 64.

Figure 8:
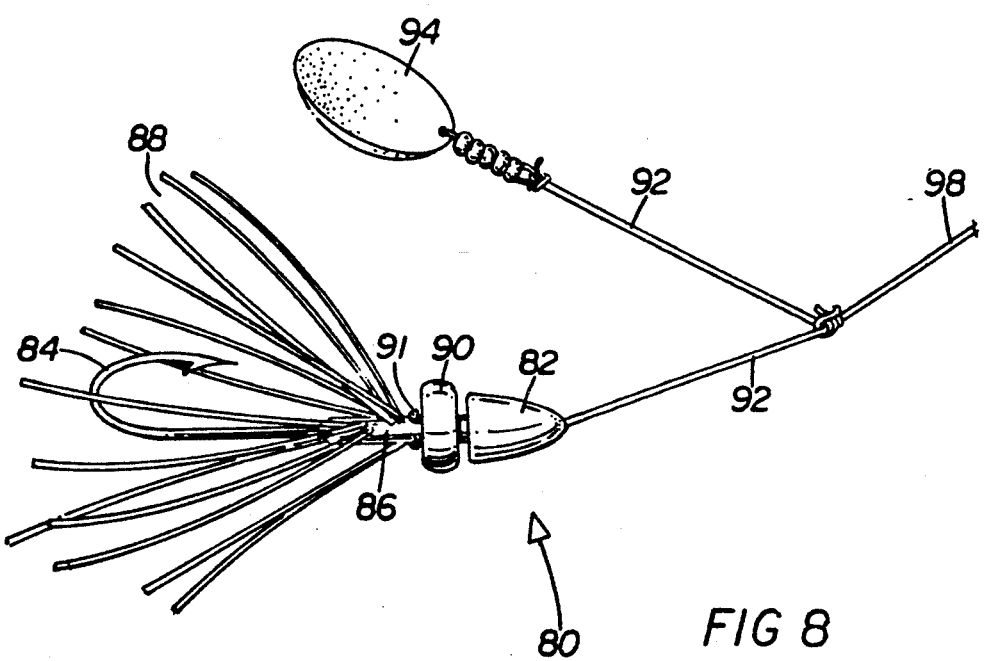
FIG. 8 is an example of a spinner bait constructed utilizing one of my novel noise making collars, with an adjacent spinner blade inducing a desirable amount of vibration that serves to enhance the action of the collar and the noise-producing members contained therein.

In FIG. 8 I reveal a spinner bait 80 utilizing my novel noise-making collar 90. This type of device may be created with the head member 82, such as of lead, having an elongate portion 86, upon which one of my novel noise-making collars 90 is loosely mounted. As will be noted from FIG. 8, a hook 84 extends rearwardly from the elongate portion 86. A skirt member 88 may be mounted upon the elongate portion 86, made up, for example, of polyurethane fibers, or of so-called living rubber components, which make the hook less visible to the fish. Other types of skirts are obviously possible.

The type of device depicted in FIG. 8 may be constructed with a length of wire 92 protruding from the front of the head member 82. This piece of wire 92 may be several inches long, with a spinner blade 94 attached to the end of the length of wire. The spinner blade is generally oval, but has a cup-shaped configuration such that it will undertake a curved path as it moves through the water. I have found that the spinner blade serves as a very effective -vibration-producing means.

A bend is created at approximately the mid point of the wire 92, typically forming a small loop, and at this location the fishing line 98 is attached. The wire 92 may thus be regarded as having two branches, upon one of which the spinner blade 94 is freely supported in such a manner that it can provide a desirable amount of vibration in the rig as the spinner blade undertakes a distinct motion through the water.

Important to this embodiment of my invention is the use of a collar member 90 loosely disposed upon the elongate, rearwardly extending member 86, in which collar are contained noise-producing members, such as a number of balls or spheres of the type previously described. A stop or abutment 91 is utilized on the member 86 to prevent the excursion of the collar 90 along this member from being too great. These balls or spheres will create a distinct noise as the collar is caused to undertake motion along the extension member 86, with the relative motion of the spinner blade with respect to the water causing the balls or spheres in the collar 90 to make an increased amount of noise, considerably greater than the noise ordinarily made. This is because the action of the spinner blade 94 is such as to induce a substantial amount of shimmy or vibration into the collar 90 via the wire 92, and thence into the balls or spheres contained inside the collar, thus causing a sufficient amount of agitation of the balls or spheres as to assure a substantially increased noise level. Because of the relative stiffness of the wire 92, the spinner blade will, during use, operate at a desirable distance away from the body member.

It is thus to be seen that I have provided a highly effective yet low cost, lure type device that is able to be used very advantageously by fishermen. The noise-making collar I utilize on the body member of my device not only makes a noise by virtue of its interaction with the body member, but also, if the collar is hollow and contains noise-producing members, it provides a distinctively different type of noise as such noise-producing members undertake movement. Furthermore, the use of my device with a vibration-producing means, such as a spinner blade, will bring about a highly effective, additional agitation of the noise-producing members.

I am obviously not to be limited to the use of any certain plastics in creating the molded plastic parts of the lure type devices in accordance with this invention, but in many instances I prefer to use either polypropylene or polycarbon in the manufacture of these plastic parts. Inasmuch as my lure type devices are to be used with other fishing components, it is important that proper design practices be followed, such that all of the materials used in the lures and ancillary devices are compatible, and do not react adversely to each other.

I claim:

1. A lure type device adapted for use by a fisherman, said device comprising a non-floating body member having a tapered front portion and a central axis, said body member being readily installed upon a fishing line and having an elongate portion of reduced diameter extending rearwardly from said tapered front portion, along such central axis, a collar loosely disposed on said elongate portion, said collar moving with respect to said elongate portion as said device moves through the water, with the movement of said collar along said elongate portion creating a noise attractive to fish.

2. The device adapted for use by fishermen as recited in claim 1 in which said elongate portion has a distal end, and means are located on said distal end of said elongate portion for preventing displacement of said collar from said elongate portion.

3. The device adapted for use by fishermen as recited in claim 1 in which said means are located on said elongate portion for limiting the amount of movement said collar is able to make during use of said device.

4. The device adapted for use by fishermen as recited in claim 1 in which said body member has a small forward portion, enlarging rearwardly toward said elongate portion, and terminating in a rear portion approximately the same diameter as that of said collar.

5. The device adapted for use by fishermen as recited in claim 4 in which a series of encircling rings are located adjacent said rear portion of said body member.

6. The device adapted for use by fishermen as recited in claim 1 in which a hole is provided along the central axis of said body member, through which hole a fishing line may extend.

7. The device adapted for use by fishermen as recited in claim 1 in which a fixed attachment point is provided at the front of said device, to which a fishing line can be attached.

8. The device adapted for use by fishermen as recited in claim 1 in which said collar has a hollow interior portion, in which one or more noise-producing members are disposed, said members tending to shift positions during movement of said collar upon said elongate portion, with such shifting of said members causing noise attractive to fish, latter noise being in addition to the basic noise made by the movement of said collar along said elongate portion.

9. The device adapted for use by fishermen as recited in claim 8 in which vibration-producing means are located in conjunction with said device, serving to induce additional motion into said noise-producing members.

10. A lure-type device adapted for use by a fisherman, said fisherman, said device comprising a non-floating body member having a tapered front portion disposed along a central longitudinal axis, said body member being readily installed upon a fishing line and having an elongate portion of reduced diameter extending rearwardly from said tapered front portion, along such central axis, a separate, toroidally-shaped collar member loosely disposed upon said elongate portion, said collar member moving with respect to said elongate portion for a limited extent as said device moves through the water, with the movement of said collar member with respect to said elongate portion creating a noise attractive to fish.

11. The device adapted for use by fishermen as recited in claim 10 in which said elongate portion has a distal end, and means are located on said distal end of said elongate portion for preventing displacement of said collar member from said elongate portion.

12. The device adapted for use by fishermen as recited in claim 10 in which excursion-limiting means are located on said elongate portion for limiting the amount of movement said collar member is able to make during use of said device.

13. The device adapted for use by fishermen as recited in claim 10 in which said body member has a small forward portion, enlarging rearwardly toward said elongate portion, and terminating in a rear portion approximately the same diameter as that of said collar member.

14. The device adapted for use by fishermen as recited in claim 13 in which a series of encircling rings are located adjacent said rear portion.

15. The device adapted for use by fishermen as recited in claim 10 in which a hole is provided along the central axis of said body member, through which hole a fishing line may extend.

16. The device adapted for use by fishermen as recited in claim 10 in which a fixed attachment point is provided at the front of said device, to which a fishing line can be attached.

17. The device adapted for use by fishermen as recited in claim 10 in which said collar member has a hollow interior portion, in which a number of noise-producing members are loosely disposed, said members tending to shift their respective positions during movement of said collar member upon said elongate portion, with such shifting of said members causing noise attractive to fish, latter noise being in addition to the basic noise made by the movement of said collar member along said elongate portion.

18. The device adapted for use by fishermen as recited in claim 17 in which vibration-producing means are utilized in conjunction with said device, serving to induce additional motion into said noise-producing members.

19. A device adapted for use by fishermen as recited in claim 17 in which vibration-producing means are utilized in conjunction with said device, said vibration-producing means being in the form of a spinner blade utilized in conjunction with said body member to form a spinner bait rig, the motion of said spinner blade being transmitted through a wire to said body member and thence to said collar member, to induce motion into said noise-producing members.

* * * * *